US012085046B2

(12) United States Patent
Dong et al.

(10) Patent No.: US 12,085,046 B2
(45) Date of Patent: Sep. 10, 2024

(54) EGR SYSTEM AND VEHICLE

(71) Applicant: GUANGZHOU AUTOMOBILE GROUP CO., LTD., Guangzhou (CN)

(72) Inventors: Chunyan Dong, Guangzhou (CN); Chengbo Lin, Guangzhou (CN); Xu Zhang, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 18/016,445

(22) PCT Filed: Jun. 12, 2021

(86) PCT No.: PCT/CN2021/099905
§ 371 (c)(1),
(2) Date: Jan. 16, 2023

(87) PCT Pub. No.: WO2022/022119
PCT Pub. Date: Feb. 3, 2022

(65) Prior Publication Data

US 2023/0279828 A1 Sep. 7, 2023

(30) Foreign Application Priority Data

Jul. 28, 2020 (CN) ........................ 202010738093.3

(51) Int. Cl.
*F02M 26/28* (2016.01)
*F02M 26/32* (2016.01)

(52) U.S. Cl.
CPC ............ *F02M 26/28* (2016.02); *F02M 26/32* (2016.02)

(58) Field of Classification Search
CPC ........ F02M 26/28; F02M 26/32; F02M 26/22; F02M 26/30; F02M 26/35; F02M 26/33;
(Continued)

(56) References Cited

U.S. PATENT DOCUMENTS

2008/0196679 A1 8/2008 Irmler et al.
2015/0316006 A1* 11/2015 Mack ..................... F02M 26/25 123/568.12

(Continued)

FOREIGN PATENT DOCUMENTS

CN 105422328 3/2016
JP 2003-328863 11/2003

(Continued)

OTHER PUBLICATIONS

Machine Translation JP 2013-68120 (Year: 2023).*
Machine Translation CN 105422328 (Year: 2024).*

*Primary Examiner* — Dapinder Singh
(74) *Attorney, Agent, or Firm* — ScienBiziP, P.C.

(57) ABSTRACT

Provided are an exhaust gas recirculation (EGR) system and a vehicle. The EGR system includes a cooler, a first end of the cooler is provided with an air inlet for connecting to an exhaust system of the vehicle, and a second end of the cooler is provided with an air outlet, an air passage is connected between the air inlet and the air outlet in the cooler, and the air outlet is at a position higher than the air inlet in a vertical direction. The cooler is further provided with at least one water inlet for a cooling liquid to enter and at least one water outlet for discharging waste cooling liquid.

10 Claims, 2 Drawing Sheets

(58) Field of Classification Search
CPC ........ F02M 26/50; F02M 26/05; F02M 26/06; F02M 26/23; F02M 26/17; F02M 26/14; F02M 26/19; F02M 31/20; F28D 21/0003; F02B 29/0462; F02B 29/0437; F01N 5/02; F01N 2240/02; Y02T 10/12; Y02T 10/40
See application file for complete search history.

(56) References Cited

U.S. PATENT DOCUMENTS

| | | | | |
|---|---|---|---|---|
| 2017/0314519 | A1* | 11/2017 | Wicks | F02B 29/0475 |
| 2018/0051660 | A1* | 2/2018 | Marsh | F02M 26/25 |

FOREIGN PATENT DOCUMENTS

| | | | |
|---|---|---|---|
| JP | 2013-68120 | * | 4/2013 |
| JP | 2017-31816 | | 2/2017 |

* cited by examiner

EGR SYSTEM AND VEHICLE

TECHNICAL FIELD

The disclosure relates to a field of automobiles, in particular to an EGR system and a vehicle.

BACKGROUND TECHNIQUE

Exhaust gas recirculation (EGR) system is used in internal combustion engines to reduce emissions and increase combustion efficiency. Exhaust gas discharged from a combustion chamber is reduced in temperature after heat exchange by a cooler, and then enters the combustion chamber for combustion and utilization after passing through the EGR system, thereby increasing a density of air entering the engine, and thus increasing an engine power and improving fuel efficiency.

When the exhaust gas is cooled in the cooler, condensation droplets are formed. Generally, there are two types of engines with EGR systems: supercharged engines and self-priming engines. In the prior art, in order to improve the heat exchange efficiency, when setting an intake end and an exhaust end of the cooler, the intake end of the cooler is generally set higher than the outlet end, but such a setting is not suitable for the EGR system and the engine, and disadvantages include: when the inlet end of the cooler is set higher than the outlet end of the engine with a supercharger, droplets condensed in an air passage of the cooler flow into the supercharger, and a larger liquid accelerates a cavitation of a surface of a supercharger impeller, cavitation causes impeller failure. If the inlet end and outlet end of the cooler are set on a same plane, the condensed droplets in the cooler remain in the cooler, and because the droplets condensed by the exhaust gas deviates from neutrality, which causes corrosion to the cooler, and accelerates a failure of the cooler; the self-priming engine does not have a supercharger. If the inlet end of the cooler is higher than the outlet end, the droplets flow back into the combustion chamber with the EGR gas, which is not good for the combustion chamber and causes the engine to knock, and affect a performance of the engine; if the inlet and outlet ends of the cooler are on the same plane, condensed water remaining in the cooler also corrodes the cooler.

Therefore, there is a technical problem in the prior art that the cooling droplets generated by the EGR system easily corrode the supercharger or impair the performance of the engine.

SUMMARY OF THE DISCLOSURE

The purpose of the present disclosure is to provide an EGR system in view of the technical problem that the cooling droplets produced by the existing EGR system easily corrode the supercharger or damage the performance of the engine; another purpose of the present disclosure is to provide a vehicle.

In order to achieve the above purpose, the present disclosure provides an EGR system, comprising a cooler, a first end of the cooler is provided with an air inlet for connecting to an exhaust system of a vehicle, and a second end of the cooler is provided with an air outlet, an air passage is connected between the air inlet and the air outlet in the cooler, and the air outlet is at a position higher than the air inlet in a vertical direction, so that the air passage extends upward from the air inlet to the air outlet;

The cooler is further provided with at least one water inlet for a cooling liquid to enter and at least one water outlet for discharging waste cooling liquid.

As a preferred solution, an included angle between a line connecting the air inlet and the air outlet and a horizontal plane is A, where 10°≤A≤75°.

As a preferred solution, the cooler is arranged horizontally, the air inlet and the air outlet are respectively arranged at two ends of the cooler, and the air outlet is located at an upper part of the air inlet.

As a preferred solution, the cooler is inclined upward from the air inlet to the air outlet.

As a preferred solution, the air inlet is connected with an air inlet pipe, and the air outlet is connected with an air outlet pipe; the water inlet is connected with a water inlet pipe, and the water outlet is connected with a water outlet pipe;

An EGR valve is connected with an outlet of the air outlet pipe, and the EGR valve is connected with a combustion chamber through a three-way pipe, and the three-way pipe is also connected with an air intake pipe.

As a preferred solution, there are one water inlet and one water outlet, the water inlet is provided at one end of the cooler close to the air inlet, and the water outlet is provided at one end of the cooler close to the air outlet, a height of the water inlet is lower than a height of the water outlet.

As a preferred solution, there are one water inlet and one water outlet, the water inlet is connected with an end of the cooler close to the air outlet, and the water outlet is connected with an end of the cooler close to the air outlet.

As a preferred solution, the water inlet comprises a first water inlet provided close to a first end of the cooler and a second water inlet provided close to a second end of the cooler; the water outlet comprises a first water outlet close to the first end of the cooler and a second water outlet close to the second end of the cooler.

As a preferred solution, both the first water inlet and the second water inlet are connected with a water inlet pipe, both the first water outlet and the second water outlet are connected with a water outlet pipe, and each of the water inlet pipe and the outlet pipe is a three-way pipe comprising a valve.

As a preferred solution, there are a plurality of water inlets and a plurality of water outlets;

The plurality of water inlets is evenly arranged along a length direction of a first side of the cooler; and the plurality of the water outlets is evenly arranged along the length direction of a second side of the cooler.

A vehicle comprising the above-mentioned EGR system.

Compared with the prior art, the beneficial effects of the present disclosure are:

The EGR system of the present disclosure includes the cooler, the air passage is connected between the air inlet and the air outlet in the cooler, and the height of the air outlet is higher than the height of the air inlet in the vertical direction, so that the air passage extends upward from the air inlet to the air outlet; the exhaust gas from the exhaust system enters the cooler from the air inlet, and the cooler is also provided with at least one water inlet for cooling liquid to enter and at least one water outlet for discharge the waste cooling liquid. Since the height of the air inlet of the cooler in the vertical direction is lower than the height of the air outlet of the cooler, the droplets condensed on a wall surface of the air passage flow back to the air inlet, and the droplets are evaporated to be small vaporized droplets by high temperature gas at the air inlet, the vaporized droplets are cooled in the cooler and then enter the combustion chamber for combustion, so as to effectively utilize the droplets in the cooler, improve the recycling efficiency of exhaust gas, and avoid knocking of the combustion chamber caused by large-diameter droplets formed in the cooler directly enter the combustion chamber in the conventional technology, and avoid corrosion of the supercharger impeller caused by the large-diameter droplets entering the supercharger or a corrosion of the cooler caused by the large-diameter droplets remaining in the cooler. In the combustion chamber, vaporized smaller-diameter droplets also increase a compression ratio of the fuel, which is helpful for a combustion of the combustion chamber, thereby improving a thermal efficiency of the engine and reducing fuel consumption. At the same time, since the air inlet end is lower than the air outlet end, a heat exchange efficiency is reduced to a certain extent. In order to overcome this problem, the present application provides the water inlet and the water outlet on the cooler, and a number and a position of the water inlet and a number and a position of water outlet can be adjusted according to different temperatures and the heat exchange efficiency, and directions of the water inlets, the number of water inlets, directions of the water outlets and the number of water outlets can be adjusted according to the heat exchange efficiency, so as to solve the problem of condensation droplets in the air passage of the cooler while ensuring that the heat exchange efficiency is not reduced.

Figure 1:
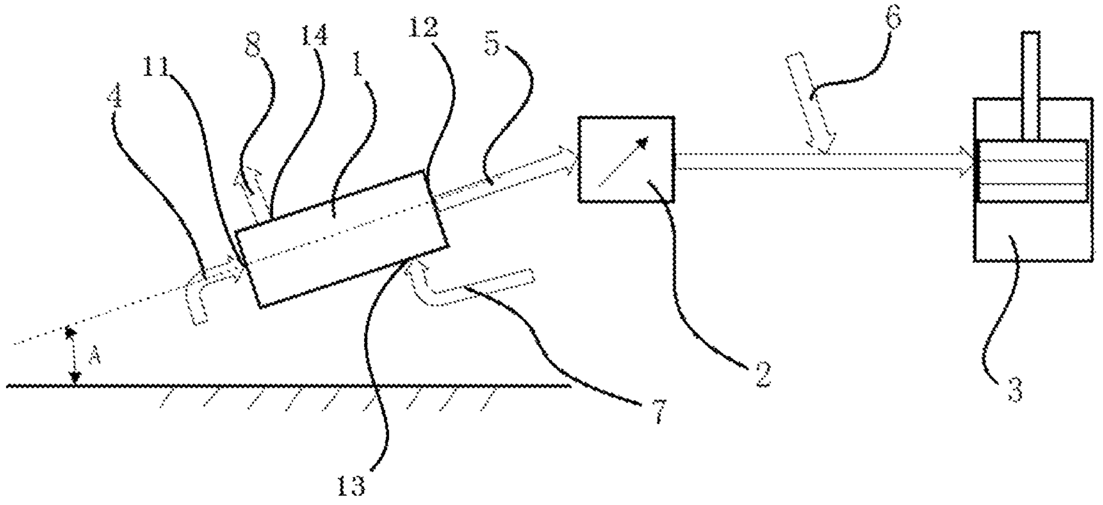
FIG. 1 is a schematic structural diagram of an EGR system provided by one embodiment of the present disclosure.
Figure 2:
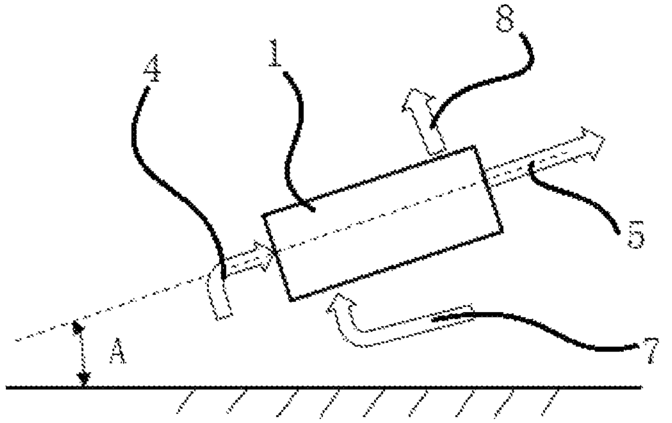
FIG. 2 is a first schematic diagram of a system layout of the cooler of the EGR system provided by one embodiment of the present disclosure.
Figure 3:
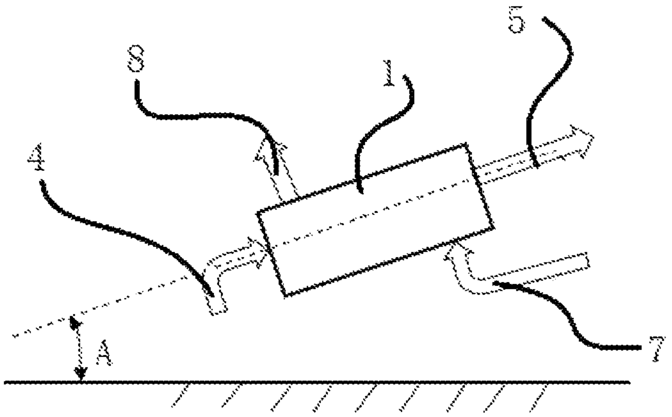
FIG. 3 is a second schematic diagram of the system layout of the cooler of the EGR system provided by one embodiment of the present disclosure.

In these figures, 1 represents a cooler; 11 represents an air inlet; 12 represents an air outlet; 13 represents a water inlet; 14 represents a water outlet; 2 represents an EGR valve; 3 represents a combustion chamber; 4 represents an intake pipe; 5 represents an air outlet pipe; 6 represents an air intake pipe; 7 represents a water inlet pipe; 8 represents a water outlet pipe.

DETAILED DESCRIPTION

The specific embodiments of the present disclosure will be described in further detail below with reference to the accompanying drawings and embodiments. The following examples are intended to illustrate the present disclosure, but not to limit the scope of the present disclosure.

In the description of the present disclosure, it should be understood that the orientations or positional relationships indicated by the terms "upper", "lower", "left", "right", "top", "bottom", etc. are based on those shown in the accompanying drawings The orientation or positional relationship is only for the convenience of describing the present disclosure and simplifying the description, rather than indicating or implying that the referred device or element must have a specific orientation, be constructed and operated in a specific orientation, and therefore should not be construed as a limitation of the present disclosure. It should be understood that the terms "first", "second", etc. are used in the present disclosure to describe various information, but this information should not be limited to these terms, which are only used to distinguish the same type of information from each other. For example, "first" information may also be referred to as "second" information, and similarly, "second" information may also be referred to as "first" information, without departing from the scope of the present disclosure.

The preferred embodiment of the EGR system of the present disclosure, as shown in FIG. 1 to FIG. 4, the EGR system is an exhaust gas recirculation system, an engine is connected with an intake system and an exhaust system of the vehicle, the engine includes a combustion chamber 3, and the EGR system is connected with an air outlet of the combustion chamber 3 of the engine, specifically, the EGR system includes a cooler 1, a first end of the cooler 1 is provided with an air inlet 11, a second end of the cooler is provided with an air outlet 12, an air passage is connected between the air inlet 11 and the air outlet 12, and a height of the air outlet 12 is higher than a height of the air inlet 11 in a vertical direction, so that the air passage extends upward from the air inlet 11 to the air outlet 12. Specifically, the air passage in the cooler can be arranged in a spiral or linear shape, and regardless of an arrangement of the air passage being in the spiral or curved or linear shape, an overall extension direction of the air passage from the air inlet 11 to the air outlet 12 is an upward extension, and at the same time, the cooler 1 is also provided with at least one water inlet 13 for a cooling liquid to enter and is also provided with at least one water outlet 14 for discharging waste cooling liquid.

The exhaust gas discharged from the exhaust system enters the cooler 1 from the air inlet 11, the exhaust gas enters the air passage, the water inlet 13 discharges the cooling liquid to an outside of the air passage, and the cooling liquid exchanges heat with high-temperature exhaust gas in the air passage to make the exhaust gas atmosphere, because the air passage is inclined and extended upward from a direction of the air inlet 11 to a direction of the air outlet 12, droplets condensed on a wall surface of the air passage flow back to the air inlet 11, and the droplets are evaporated into smaller vaporized droplets by an action of the high temperature gas at the inlet 11, the vaporized droplets are cooled in the air passage 1 and then enter the combustion chamber with the exhaust gas for combustion, so as to effectively utilize the droplets in the cooler 1 and improve a recycling efficiency of the EGR system, and avoid knocking of the combustion chamber caused by large-diameter droplets formed in the air passage directly entering the combustion chamber 3 in the conventional technology, and avoid corrosion of a supercharger impeller caused by the large-diameter droplets entering a supercharger or a corrosion of the cooler 1 caused by the large-diameter droplets remaining in the cooler 1. In the combustion chamber 3, vaporized smaller-diameter droplets also increase a compression ratio of a fuel, which is helpful for a combustion of the combustion chamber 3, thereby improving a thermal efficiency of the engine and reducing fuel consumption. At the same time, since the air inlet end is lower than the air outlet end, an heat exchange efficiency is reduced to a certain extent. In order to overcome this problem, the present application provides the water inlet 13 and the water outlet 14 on the cooler 1, and a number and a position of the water inlet 13 and a number and a position of water outlet 14 can be adjusted according to different temperatures and the heat exchange efficiency, and directions of the water inlets 13, the number of water inlets 13, directions of the water outlets 14 and the number of water outlets 14 can be adjusted according to the heat exchange efficiency, so as to solve the problem of condensation droplets in the air passage of the cooler 1 while ensuring that the heat exchange efficiency is not reduced.

Where, an angle between a connection line between the air inlet 11 and the air outlet 12 and a horizontal plane is set to be A. In the EGR system of the present application, 10°≤A≤75°, this angle range can ensure that the droplets in the cooler 1 are smoothly returned to the air inlet 11, and the angle A and the positions of the air inlet 11 and the air outlet 12 can also be adjusted according to needs of use.

Further, in order to realize the inclined upward arrangement of the air passage from the air inlet 11 to the air outlet 12, the cooler 1 in the present application can be specifically arranged in two ways: when the cooler 1 is placed horizontally, the cooler 1 inside is provided with a liquid channel. The air passage and the liquid channel are separated by a plurality of connected fins. The water inlet 13 and the water outlet 14 are connected with the liquid channel. The air inlet 11 and the air outlet 12 are located at both ends of the air passage respectively, the air passage extends obliquely upward from the air inlet 11 to the air outlet 12, and the air outlet 12 is above a horizontal plane of the air inlet 11, so that when the cooler 1 is arranged horizontally, the air passage as a whole is defined obliquely upwards from the air inlet 11 to the air outlet 12; or a height of the air outlet 12 on the cooler 1 and a height of the air inlet 11 can be set to be at a same level, and the cooler 1 is arranged obliquely, and the cooler 1 is inclined upward from the air inlet 11 to the air outlet 12, and an inclined angle is the above-mentioned angle A, so as to achieve the purpose of an arrangement being obliquely upwards from the air inlet 11 to the air outlet 12.

Where, the EGR system of the present application further includes an EGR valve 2, an air inlet pipe 4 is connected with the air inlet 11 of the cooler 1, an air outlet pipe 5 is connected with the air outlet 12, and an outlet of the air outlet pipe 5 is connected with the EGR valve 2, and the EGR valve 2 is connected with the combustion chamber 3 through a three-way pipe, and the three-way pipe is connected with an air intake pipe 6. Specifically, one end of the EGR valve 2 is connected with the air outlet pipe 5, and another end of the EGR valve 2 is connected with one nozzle of a three-way pipe, and other two nozzles of the three-way pipe are connected are respectively connected with the combustion chamber 3 and the air intake pipe 6. The exhaust gas generated by the combustion chamber 3 enters the cooler 1 through the air inlet pipe 4, and the cooling liquid enters the cooler 1 through the water inlet pipe. In the cooler 1, the high-temperature exhaust gas and the cooling liquid realize heat exchange, and the exhaust gas after heat exchange flows out through the air outlet pipe 5 and enters the EGR valve 2, the EGR valve 2 is connected with the motor, and the motor is connected with EGR valve 2 to control the flow of the exhaust gas to realize a control of EGR rate, the exhaust gas passing through the EGR valve 2 is mixed with the air through the three-way pipe and then enters the combustion chamber 3 for reuse Wherein, a number of water inlets 13 and a number of water outlets 14 of the cooler 1 of the present application may be set to be one or two or more, the water inlet 13 is connected with the water inlet pipe 7, and the water outlet 14 is connected with the water outlet pipe 8.

When there is one water inlet 13 and one water outlet 14 are provided, the water inlet 13 is provided at an end of the cooler 1 close to the air inlet 11, and the water outlet 14 is provided at an end of the cooler 1 close to the air outlet 12. In this way, after the cooling liquid enters from the water inlet 13, the cooling liquid can quickly contact high temperature gas in the air inlet 11, and the high temperature gas flows from the air inlet 11 to the air outlet 12, which is a downstream flow, because the gas in the air inlet 11 is a high temperature gas when the temperature is higher than 600° C., the cooling liquid entering from the water inlet 13 is a low-temperature liquid, and the temperature is lower than 115° C., the gas and liquid flow in the form of co-current accelerates a speed of heat exchange and improves the heat exchange efficiency.

When there is one water inlet 13 and one water outlet are provided, the water inlet 13 is provided at one end of the cooler 1 close to the air outlet 12, the water outlet 14 is provided at one end of the cooler 1 close to the air inlet 11, and a height of the water inlet 13 is lower than a height of the water outlet 14, so as to improve the heat exchange efficiency of the cooling liquid as much as possible. At the same time, in this setting method, the cooling liquid first flows in a direction of the air inlet 11 after entering from the water inlet 13, and only when exchanges heat with the high-temperature gas, the cooling liquid flows to the air outlet 12, it is a reverse flow. A contact point between the high-temperature exhaust gas and the low-temperature cooling liquid at the air inlet port 11 is behind, and before the contact, the cooling liquid has been heated by the gas, and the gas has also been cooled by the cooling liquid, a thermal shock is reduced and a durability of the EGR cooler 1 is improved.

Figure 4:
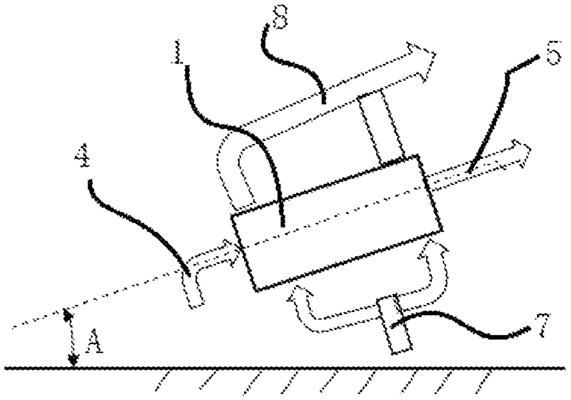
FIG. 4 is a third schematic diagram of the system layout of the cooler of the EGR system provided by one embodiment of the present disclosure.

Further, referring to FIG. 4, when two water inlets 13 and two water outlets 14 are provided, the two water inlets 13 include a first water inlet provided close to a first end of the cooler 1 and a second water inlet provided close to a second end of the cooler 1; the two water outlets 14 include a first water outlet provided close to the first end of the cooler 1 and a second water outlet provided close to the second end of the cooler 1. This arrangement can combine the above advantage of setting one water inlet and one water outlet to improve the heat exchange efficiency of a heat exchanger.

Further, both the first water inlet and the second water inlet are connected with the water inlet pipe 7, both the first water outlet and the second water outlet are connected with the water outlet pipe 8, and the water inlet pipe 7 and the water outlet pipe 8 are both three-way pipes, and there is a valve on each three-way pipe.

Wherein, when a plurality of water inlets 13 and a plurality of water outlets 14 are provided, the plurality of water inlets 13 are evenly arranged along a length direction of a first side of the cooler 1, and the plurality of water outlets 14 are evenly arranged along a length direction of a second side of the cooler 1. In this arrangement, the liquid channel in the cooler 1 is filled with the cooling liquid, which can fully exchange heat between the cooling liquid and the high-temperature exhaust gas, and improve the heat exchange efficiency.

An embodiment of a vehicle includes the EGR system described above.

The above are only the preferred embodiments of the present disclosure. It should be pointed out that for those skilled in the art, without departing from the technical principle of the present disclosure, several improvements and replacements can be made. These improvements and replacements should also be regarded as the protection scope of the present disclosure.

What is claimed is:

1. An exhaust gas recirculation (EGR) system comprising a cooler, wherein a first end of the cooler is provided with an air inlet for connecting to an exhaust system of a vehicle, and a second end of the cooler is provided with an air outlet, an air passage is connected between the air inlet and the air outlet in the cooler, and the air outlet is at a position higher than the air inlet in a vertical direction, so that the air passage extends upward from the air inlet to the air outlet;

the cooler is further provided with a plurality of water inlets for cooling liquid to enter, and is further provided with a plurality of water outlets for discharging waste cooling liquid, wherein the plurality of water inlets comprises a first water inlet provided close to a first end of the cooler and a second water inlet provided close to a second end of the cooler; the plurality of water outlets comprises a first water outlet close to the first end of the cooler and a second water outlet close to the second end of the cooler, the plurality of water inlets is evenly arranged along a length direction of a first side of the cooler, and the plurality of water outlets is evenly arranged along a length direction of a second side of the cooler;

wherein both the first water inlet and the second water inlet are connected with a water inlet pipe, both the first water outlet and the second water outlet are connected with a water outlet pipe, and each of the water inlet pipe and the outlet pipe is a three-way pipe comprising a valve.

2. The EGR system according to claim 1, wherein an included angle between a line connecting the air inlet and the air outlet and a horizontal plane is A, wherein 10°≤A≤75°.

3. The EGR system according to claim 1, wherein the air passage is in a spiral shape.

4. The EGR system according to claim 1, wherein the cooler is inclined upward from the air inlet to the air outlet.

5. The EGR system according to claim 1, wherein the air inlet is connected with an air inlet pipe, and the air outlet is connected with an air outlet pipe; the plurality of water inlets is connected with a water inlet pipe, and the plurality of water outlets is connected with a water outlet pipe;

an EGR valve is connected with an outlet of the air outlet pipe, and the EGR valve is connected with a combustion chamber through a three-way pipe, and the three-way pipe is further connected with an air intake pipe.

6. A vehicle comprising an engine and an exhaust gas recirculation (EGR) system, the engine being connected with the EGR system, wherein the EGR system comprises a cooler, a first end of the cooler is provided with an air inlet for connecting to an exhaust system of the vehicle, and a second end of the cooler is provided with an air outlet, an air passage is connected between the air inlet and the air outlet in the cooler, and the air outlet is at a position higher than the air inlet in a vertical direction, so that the air passage extends upward from the air inlet to the air outlet;

the cooler is further provided with a plurality of water inlets for cooling liquid to enter, and is further provided with a plurality of water outlets for discharging waste cooling liquid, wherein the plurality of water inlets comprises a first water inlet provided close to a first end of the cooler and a second water inlet provided close to a second end of the cooler; the plurality of water outlets comprises a first water outlet close to the first end of the cooler and a second water outlet close to the second end of the cooler, the plurality of water inlets is evenly arranged along a length direction of a first side of the cooler, and the plurality of water outlets is evenly arranged along a length direction of a second side of the cooler;

wherein both the first water inlet and the second water inlet are connected with a water inlet pipe, both the first water outlet and the second water outlet are connected with a water outlet pipe, and each of the water inlet pipe and the outlet pipe is a three-way pipe comprising a valve.

7. The vehicle according to claim 6, wherein an included angle between a line connecting the air inlet and the air outlet and a horizontal plane is A, wherein 10°≤A≤75°.

8. The vehicle according to claim 6, wherein the air passage is in a spiral shape.

9. The vehicle according to claim 6, wherein the cooler is inclined upward from the air inlet to the air outlet.

10. The vehicle according to claim 6, wherein the air inlet is connected with an air inlet pipe, and the air outlet is connected with an air outlet pipe; the plurality of water inlets is connected with a water inlet pipe, and the plurality of water outlets is connected with a water outlet pipe; an EGR valve is connected with an outlet of the air outlet pipe, and the EGR valve is connected with a combustion chamber through a three-way pipe, and the three-way pipe is further connected with an air intake pipe.

* * * * *